United States Patent [19]

Sondermann

[11] 4,278,560
[45] Jul. 14, 1981

[54] METHOD FOR MANUFACTURING GADOLINIUM-CONTAINING NUCLEAR FUELS

[75] Inventor: Thomas Sondermann, Kahl, Fed. Rep. of Germany

[73] Assignee: RBU, Reaktor-Brennelment Union GmbH, Hanau, Fed. Rep. of Germany

[21] Appl. No.: 102,529

[22] Filed: Dec. 11, 1979

[30] Foreign Application Priority Data

Dec. 12, 1978 [DE] Fed. Rep. of Germany ....... 2853599

[51] Int. Cl.³ .............................................. G21C 3/62
[52] U.S. Cl. ................................ 252/301.1 R; 176/69; 176/93 BP
[58] Field of Search ................... 252/301.1 R; 423/15; 176/69, 93 BP

[56] References Cited

U.S. PATENT DOCUMENTS

| 3,263,004 | 7/1966 | Bean ............................... 176/93 BP |
| 3,501,411 | 3/1970 | Trigianni et al. .............. 252/301.1 S |
| 3,676,075 | 7/1972 | Ploger et al. ........................... 423/15 |
| 3,778,380 | 12/1973 | Baker et al. .................... 252/301.1 R |
| 3,790,658 | 2/1974 | Fox et al. .................................. 423/15 |
| 3,825,499 | 7/1974 | Johnson ,......................... 252/301.1 R |
| 3,917,768 | 11/1975 | Abate-Daga et al. ........ 252/301.1 R |

FOREIGN PATENT DOCUMENTS 1046965  10/1966  United Kingdom ................ 176/93 BP Primary Examiner—Deborah L. Kyle
Attorney, Agent, or Firm—Herbert L. Lerner; Laurence A. Greenberg

[57] ABSTRACT

Mixed crystals containing uranium and gadolinium for conversion into nuclear fuels by introducing $NH_3$, $CO_2$ and a uranyl salt solution containing dissolved gadolinium into a body of an aqueous solution of ammonium carbonate. As a result salts of gadolinium and uranium complexes precipitate and during precipitation there is a lowering of the pH from 9 down to 8.2. The precipitate is separated and converted to uranium and gadolinium oxides. Preparing the mixed crystals in this manner results in the gadolinium being finely and homogeneously distributed into the oxidic nuclear fuel.

8 Claims, 1 Drawing Figure

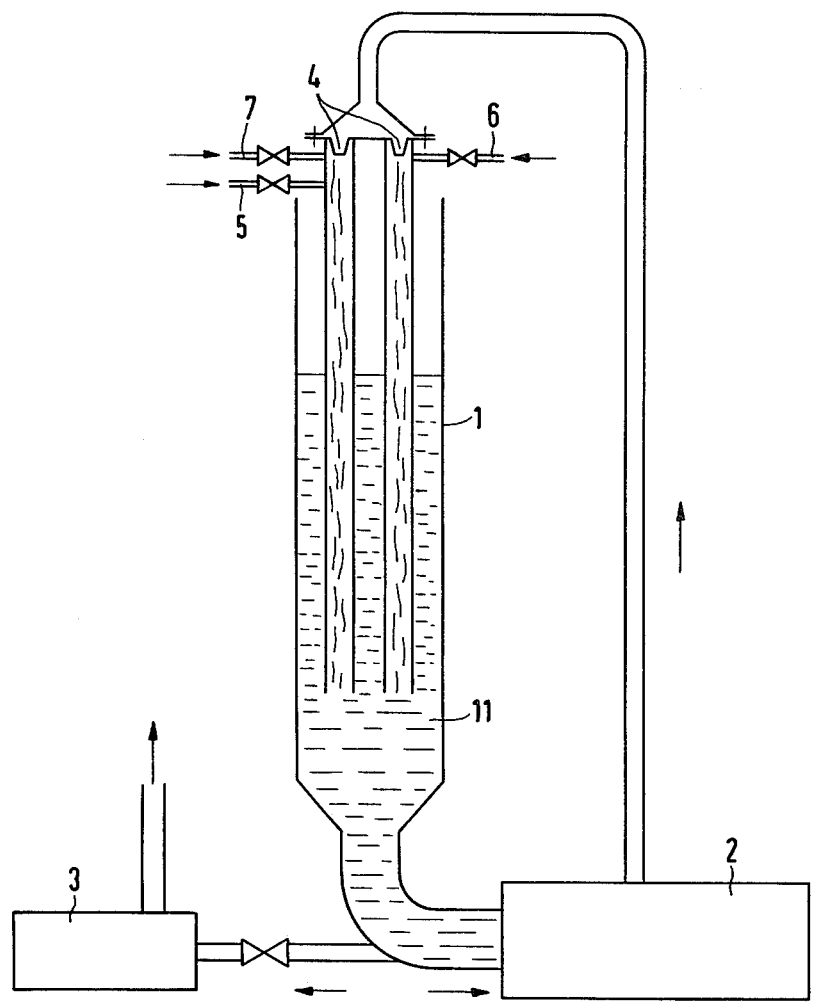

METHOD FOR MANUFACTURING GADOLINIUM-CONTAINING NUCLEAR FUELS

BACKGROUND OF THE INVENTION

1. Field of the Invention

The present invention relates to a method for manufacturing mixed crystals containing uranium and gadolinium for oxidic nuclear fuels.

2. Description of the Prior Art

The increasing demand for $UO_2$ nuclear fuel, to which gadolinium has been added, makes it more and more necessary to find a simple method of mixing gadolinium and uranium. The presently used methods are based almost exclusively on mixing gadolinium oxide ($Gd_2O_3$) mechanically with $UO_2$ powder. This presents not only mixing problems which are caused by the different densities and grain distributions of the two mixing partners but also the nuclear fuel pellet sintered from these mixed powders has considerable inhomogeneities, causing difficulty in attaining the required density approaching the theoretical density.

SUMMARY OF THE INVENTION

An object of the invention is to provide a method for incorporating and distributing the gadolinium finely and homogeneously into the oxidic nuclear fuel by effecting such distribution in mixed crystals containing uranium and gadolinium. The mixed crystals are converted to uranium and gadolinium oxides for nuclear fuel.

With the foregoing and other objects in view, there is provided in accordance with the invention a method for manufacturing mixed crystals containing uranium and gadolinium for conversion into nuclear fuels, which comprises maintaining a body of an aqueous solution of ammonium carbonate at a pH of 9, introducing $NH_3$, $CO_2$ and a uranyl salt solution containing the desired gadolinium in dissolved form, said uranyl salt being selected from the group consisting of uranyl nitrate and uranyl sulfate, into the aqueous solution of ammonium carbonate to precipitate ammonium salts of gadolinium and uranium complexes and during precipitation lowering the pH9 of the body of aqueous solution down to 8.2, separating the precipitate from the body of solution, and converting the precipitate of complexes containing gadolinium and uranium to uranium and gadolinium oxides.

Other features which are considered as characteristic for the invention are set forth in the appended claims.

Although the invention is illustrated and described herein as embodied in method for manufacturing gadolinium-containing nuclear fuels, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following description of specific embodiments when read in connection with the accompanying drawing which diagrammatically illustrates precipitation apparatus for carrying out the method of the invention.

DETAILED DESCRIPTION OF THE INVENTION

In accordance with the invention, a uranyl nitrate solution which contains the desired gadolinium content in dissolved form is brought, together with $NH_3$ and $CO_2$, into precipitation apparatus which contains an aqueous body of ammonium carbonate solution with a pH-value of 9. This pH value is lowered to 8.2 during the precipitation process initiated thereby. Ammonium salts of gadolinium and uranium carbonate complexes are precipitated during the precipitation process and the precipitate, after separation from the body of solution, is converted in known manner into an oxide form that can be sintered.

To illustrate the method further, reference is made to the attached drawing, which shows one form of precipitation apparatus. The precipitation vessel 1 contains a weak or dilute ammoniumcarbonate aqueous solution forming a water seal 11 with the solution having a pH of 9. A uranyl nitrate solution which contains the desired share of gadolinium in dissolved form is fed through the line 5 into, as shown in the drawing, the annulus of two vertical concentric tubes which extend down into the body of ammonium carbonate. At the same time, $CO_2$-gas is fed-in via the line 7 and $NH_3$-gas via the line 6 is fed into the annulus. Initially, the uranium and the gadolinium remain in solution. This initial solubility of the gadolinium is achieved by the alkaline ammonium carbonate seal.

Thorough mixing of the fed-in materials with the ammonium carbonate solution of the water seal 11 is achieved by means of the pump 2 which withdraws a portion of the ammonium carbonate solution and recirculates it to the top of the apparatus through the mixing nozzles 4 disposed in the annulus and then down into the body of solution 11.

In the precipitation process that sets in, the pH-value is allowed to fall slowly to 8.2. Thereby the gadolinium precipitates simultaneously with the uranium. Ammonium salts of uranium and gadolinium carbonate complexes are formed as precipitation products. After the precipitation process has ended, the suspension produced of precipitate in liquor is further circulated by means of the pump 2. The grain size of the precipitation products is equalized thereby. Subsequently, the pump 2 is switched off and the precipitated salts are transported via the pump 3 to a filtration device, not shown, for separation of the precipitate from the liquor.

These mixed crystals, after being filtered and dried, optionally together with AUC (ammonium uranyl carbonate), converted in known manner into a oxide form that can be sintered. An appropriate method is described in detail, for example, in German Pat. No. 1 59 24 71.

In another embodiment of the method shown in the drawing gaseous $UF_6$ can be fed-in via the connecting line 7 in addition to the $CO_2$-gas and is then converted in the precipitation apparatus 1 into AUC. It should further be pointed out that a uranyl sulfate solution can also be used for bringing-in the gadolinium instead of a uranyl nitrate solution.

The dependence of the precipitation of the gadolinium together with the uranium on the pH-value can be utilized so that the degree of gadolinium precipitation and thereby, the gadolinium content in the precipitated mixed crystals can be adjusted through control of the pH-drop from 9 to 8.2. In the extreme case, this provides the possibility of separating uranium and gadolinium if the pH is kept constant at 9. In that case, the gadolinium remains in the solution and only the uranium is precipitated. The limit for the solubility of gadolinium is then approximately 1%. Control or change of pH may be effected in the usual way by the addition of an acidic or basic substance. Ordinarily adequate control or change of pH may be accomplished simply by varying feed of $CO_2$ and/or $NH_3$.

The method described is therefore optimally suited to precipitate uranium and gadolinium together in the form of mixed crystals and to feed them into the normal nuclear fuel production and processing, as well as for purifying uranium solutions of gadolinium.

There is claimed:

1. Method for manufacturing mixed crystals containing uranium and gadolinium for conversion into nuclear fuels, which comprises maintaining a body of an aqueous solution of ammonium carbonate at a pH of 9, introducing $NH_3$, $CO_2$ and a uranyl salt solution containing gadolinium in dissolved form, said uranyl salt being selected from the group consisting of uranyl nitrate and uranyl sulfate, into the aqueous solution of ammonium carbonate to precipitate ammonium salts of gadolinium and uranium complexes and during precipitation lowering the pH of the body of aqueous solution down to 8.2, separating the precipitate from the body of solution, and converting the precipitate of complexes containing gadolinium and uranium to uranium and gadolinium oxides.

2. Method according to claim 1, wherein the uranyl salt is uranyl nitrate.

3. Method according to claim 1, wherein the uranyl salt is uranyl sulfate.

4. Method according to claim 1, wherein the precipitate of complexes containing gadolinium and uranium is combined with ammonium uranyl carbonate and converted to the oxide form.

5. Method according to claim 1, wherein the degree of gadolinium precipitation and thereby the gadolinium content of the mixed crystals is adjusted through control of the pH drop from 9 to 8.2 with the degree of gadolinium precipitation increasing with greater pH drop.

6. Method according to claim 1, wherein a portion of the body of aqueous solution of ammonium carbonate containing introduced $NH_3$, $CO_2$ and uranyl salt solution containing gadolinium in dissolved form, is withdrawn and recirculated to the body to aid in mixing and facilitate precipitation.

7. Method according to claim 6, wherein recirculation is continued after precipitation has ended to equalize the grain size of the precipitation products.

8. Method according to claim 1, wherein $UF_6$ is an additional material introduced into the solution of ammonium carbonate and reacts with the ammonium carbonate to form ammonium uranyl carbonate.

* * * * *